(12) United States Patent
Barton (10) Patent No.: US 12,325,000 B2
(45) Date of Patent: Jun. 10, 2025

(54) VALVE MANIFOLD FOR A WATER PURIFICATION SYSTEM

(71) Applicant: Environmental Solutions 4-Life, Inc., Ormond Beach, FL (US)

(72) Inventor: Scott Barton, Ormond Beach, FL (US)

(73) Assignee: Environmental Solutions 4-Life, Inc., Ormond Beach, FL (US)

(*) Notice: Subject to any disclaimer, the term of this patent is extended or adjusted under 35 U.S.C. 154(b) by 0 days.

(21) Appl. No.: 18/495,011

(22) Filed: Oct. 26, 2023

(65) Prior Publication Data
US 2025/0135380 A1    May 1, 2025

(51) Int. Cl.
| | |
|---|---|
| *B01D 35/147* | (2006.01) |
| *B01D 36/00* | (2006.01) |
| *B01D 37/04* | (2006.01) |
| *C02F 1/00* | (2023.01) |

(52) U.S. Cl.
CPC ........... *B01D 35/147* (2013.01); *B01D 36/00* (2013.01); *B01D 37/043* (2013.01); *C02F 1/003* (2013.01); *C02F 1/008* (2013.01); *C02F 2201/005* (2013.01); *C02F 2201/009* (2013.01); *C02F 2209/40* (2013.01); *C02F 2209/44* (2013.01); *C02F 2307/06* (2013.01)

(58) Field of Classification Search
CPC .... B01D 35/147; B01D 36/00; B01D 37/043; C02F 1/003; C02F 1/008; C02F 2201/005; C02F 2201/009; C02F 2209/40; C02F 2209/44; C02F 2307/06; E03C 2201/40
See application file for complete search history.

(56) References Cited

FOREIGN PATENT DOCUMENTS

WO    WO-2023249951 A1 * 12/2023

* cited by examiner

*Primary Examiner* — Terry K Cecil
(74) *Attorney, Agent, or Firm* — Design IP (57) ABSTRACT

Various examples are provided for water purification systems that employ filters, and more particularly to water purification systems that extend the life of such filters. In one example, the water purification system includes a valve that in an energized position allows the flow of unfiltered water through a filter assembly containing filters. A monitor is provided to detect whether the faucet has been moved to the closed position. In the event no movement of the faucet from the closed position is detected within a predefined time interval, then the valve is de-energized causing water flow to bypass the filter assembly, thus extending filter life. In another example, the water purification system provides a flow path having a straight-line geometry to provide for quieter water flow and reduces pressure drop.

16 Claims, 6 Drawing Sheets

VALVE MANIFOLD FOR A WATER PURIFICATION SYSTEM

BACKGROUND AND FIELD OF THE INVENTION

The present invention relates to a valve manifold for use as part of a water purification system that employs filters. Also, the valve manifold of the present invention includes an inlet port that is aligned coaxially with an outlet port to provide for quieter water flow along a passageway within the valve manifold between these ports and reduced complexity.

Purification of drinking water prior to domestic use is becoming increasingly important to many consumers. Water is usually purified to one extent or another by most municipalities prior to being supplied to consumers. Such municipal purification systems are, however, often inadequate and, in any event, are incapable of removing many contaminants which adversely affect the taste of drinking water and which are introduced into drinking water between the municipal purification site and the residences being serviced by the municipality. For example, chlorine, chlorine by-products, rust, or even lead are often present in city and/or residential water pipes and may be picked up by water as it flows through the pipes. In addition, rural residences often have no means of purifying drinking water prior to use.

These factors have given rise to an ever-increasing demand for water purification systems arranged to be incorporated into existing domestic plumbing systems to provide filtered water through faucets throughout the home including kitchens and bathrooms. Such purification systems may employ granulated media including activated carbon and/or other filtration media to remove contaminants.

Water purification systems work in a variety of ways to activate and deactivate water filtration during dispensing from a faucet. For example, some water purification systems utilize sensors to detect the presence of water flow, water pressure, and/or water temperature to activate water filtering and the absence of these parameters to deactivate water filtering. Other water purification systems monitor for when the faucet is turned on and off to activate and deactivate water filtering.

While such water purification systems can improve taste and odor of the water, it may not be desirable to filter all the water being supplied through the faucet when only a portion of this water is used for drinking or other applications requiring filtered water. By controlling when the water is being filtered, the cost associated with replacing expensive filters can be reduced. Some water purification systems provide a switch enabling consumers to manually actuate the switch from a bypass mode where unfiltered water is dispensed to a filtration mode where filtered water is dispensed, thus providing some control over the use of filtered water. However, these water purification systems suffer from a common disadvantage in that the system remains in filtration mode until the switch is actuated again. This can lead to filtered water being dispensed when it is not needed or desired. It is therefore desirable to provide a valve manifold as part of a water purification system that automatically returns to bypass mode only after a predetermined time elapses after the faucet is closed. In this manner, upon re-opening the faucet within the predetermined time period, filtered water continues to be dispensed even if the user neglects to re-actuate the switch to filtration mode. The system automatically returns to bypass mode only after the predefined time has elapsed. This will extend the life of the filter and reduce the inadvertent dispensing of unfiltered water.

It is also desirable to provide a valve manifold as part of a water filtration system that includes a housing having an inlet port that is aligned coaxially with an outlet port to provide for quieter water flow with less pressure drop during dispensing of unfiltered water.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Several aspects of the systems and methods are outlined below.

In one aspect of the invention, a valve manifold is provided as part of a water purification system for dispensing unfiltered or filtered water through a faucet. The valve manifold includes an electrically operated valve which is normally in an open position to permit the flow of unfiltered water through the valve manifold and to the faucet. In response to receiving a filtered water request, a control unit of the valve manifold is arranged to energize the electrically operated valve to divert the water within the valve manifold to a filter to deliver filtered water to the faucet. A monitor for detecting closing and opening of the faucet and a timer mechanism are provided. In the event the faucet is closed and reopened within a predefined interval of time, the electrically operated valve remains energized to continue delivering filtered water to the faucet. In the event the faucet remains closed for the predefined interval of time, the valve manifold deenergizes the solenoid valve to deliver unfiltered water to the faucet once the faucet is reopened.

In another aspect of the invention, the valve manifold includes an inlet port that is aligned coaxially with an outlet port to provide for quieter water flow along a passageway within the valve manifold between the inlet and outlet ports with less pressure drop.

In another aspect of the invention, the valve manifold includes a wired switch to change between filtered and unfiltered water modes. The wired switch is adapted to be mounted beneath a countertop. This enables the valve manifold to be installed without the need to drill a hole in the countertop, which often requires specialized tools and skills. Accordingly, a homeowner is more likely to be comfortable installing the valve manifold disclosed herein than those of the prior art.

BRIEF DESCRIPTION OF THE DRAWINGS

The present invention will hereinafter be described in conjunction with the appended drawing figures wherein like numerals denote like elements.

DETAILED DESCRIPTION

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. It being understood that various changes may be made in the function and arrangement of elements without departing from the spirit and scope of the invention. Various changes may be made in the function and arrangement of elements without departing from the spirit and scope of the invention.

To aid in describing the invention, directional terms may be used in the specification and claims to describe portions of the present invention (e.g., upper, lower, left, right, etc.). These directional terms are merely intended to assist in describing and claiming the invention and are not intended to limit the invention in any way. In addition, reference numerals that are introduced in the specification in association with a drawing figure may be repeated in one or more subsequent figures without additional description in the specification in order to provide context for other features.

In the claims, letters are used to identify claimed steps (e.g. (a), (b), and (c)). These letters are used to aid in referring to the method steps and are not intended to indicate the order in which claimed steps are performed, unless and only to the extent that such order is specifically recited in the claims.

Unless otherwise indicated, the articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Where used herein to identify recited features of a method or system, the terms "first," "second," "third," and so on, are used solely to aid in referring to and distinguishing between the features in question and are not intended to indicate any specific order of the features, unless and only to the extent that such order is specifically recited.

Figure 1:
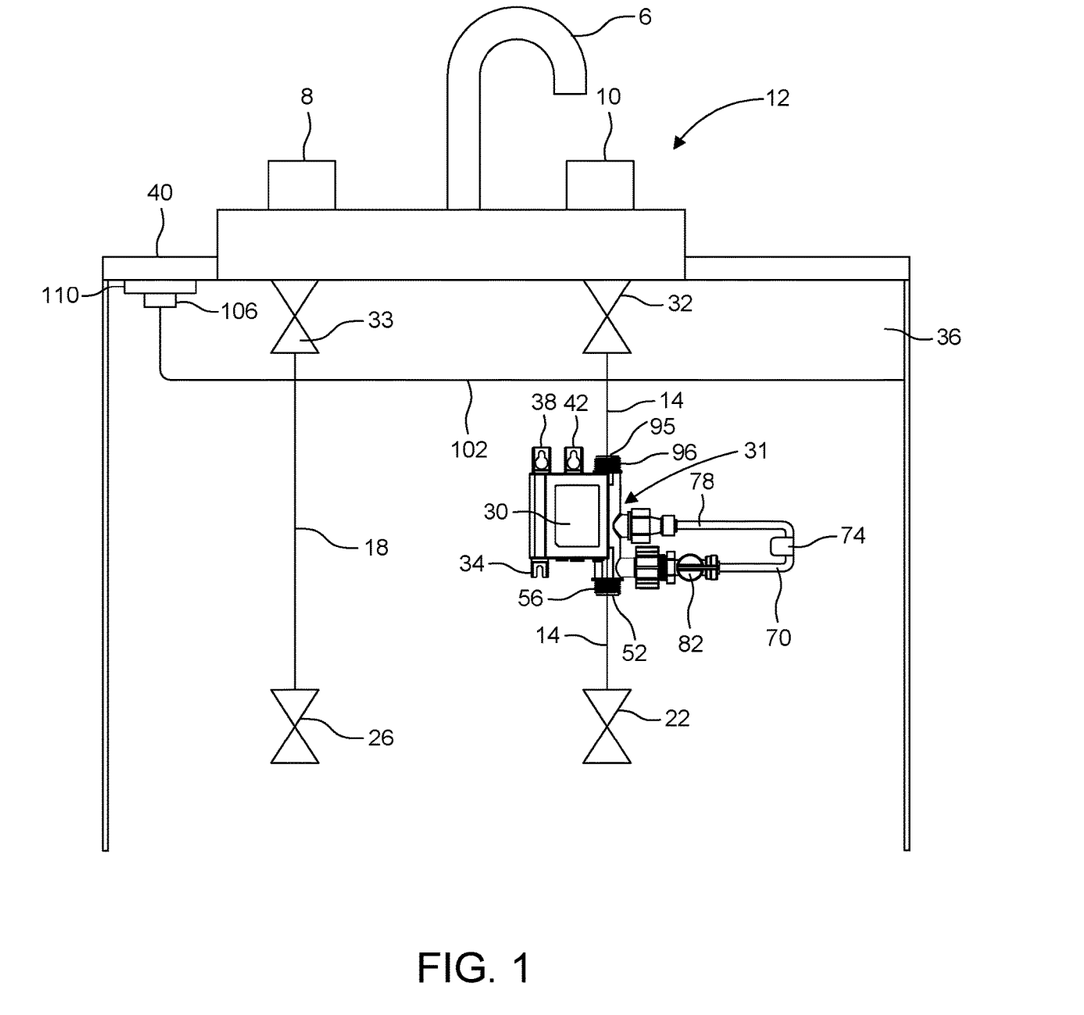
FIG. 1 is a schematic diagram of a first exemplary embodiment of a valve manifold of the present invention shown as part of a water purification system connected to an existing domestic plumbing system.
Figure 2:
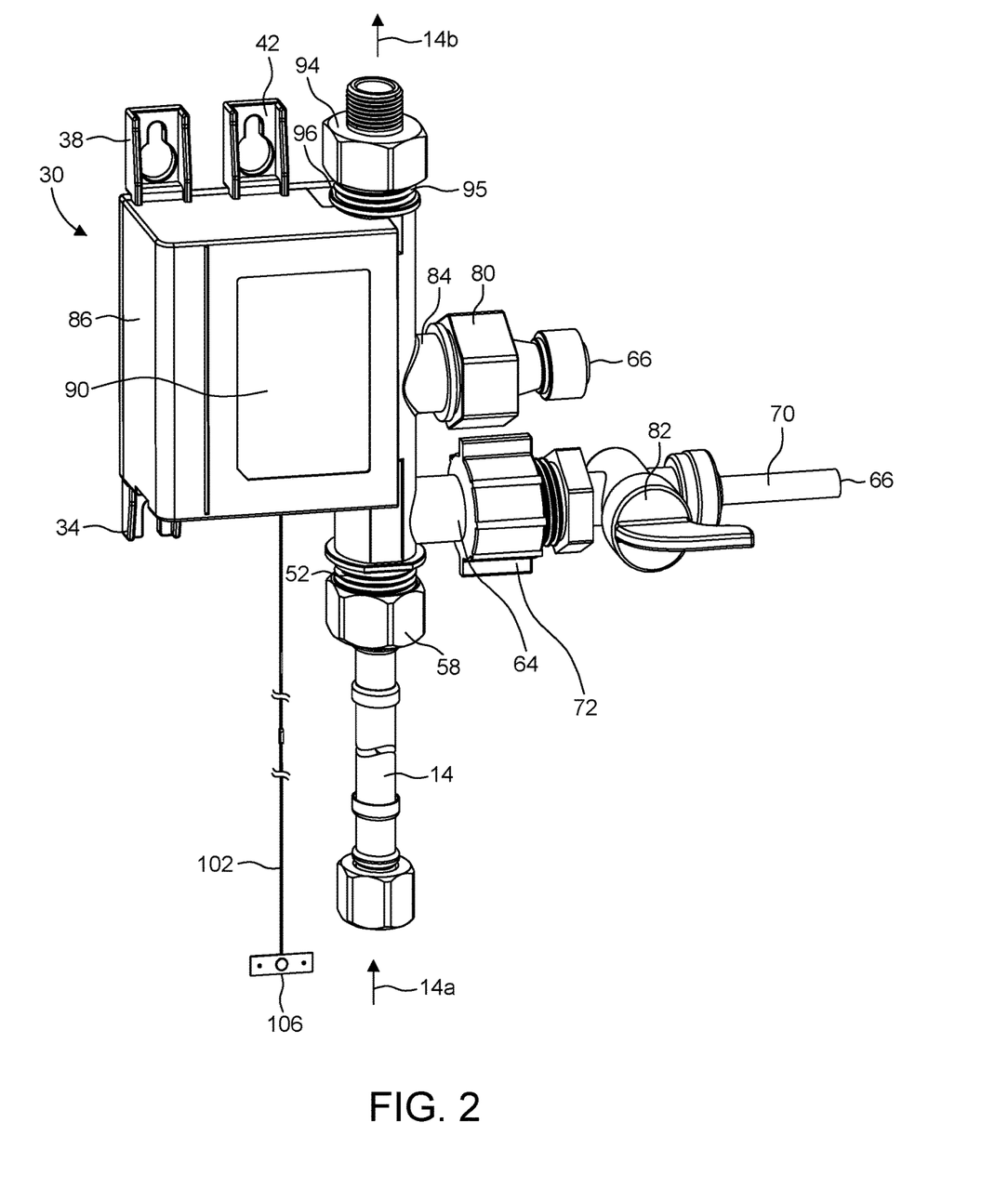
FIG. 2 is a perspective view of the first exemplary embodiment valve manifold of the present invention.

Referring now to FIGS. 1 and 2, there is shown a first embodiment of the valve manifold 30 in accordance with the present disclosure. The valve manifold 30 is a component of a water purification system 31 which employs one or more filters in a filter assembly 74 (shown schematically). The water purification system 31 including the valve manifold 30 and filter assembly 74 is shown installed within cabinetry 36 of a kitchen sink 12 utilizing mounting flanges 34, 38, and 42. The mounting flanges 34, 38, and 42 may be provided with keyhole openings to enable mounting of the water purification system 31 including the valve manifold 30 directly to a wall of the cabinetry 36. For example, the valve manifold 30 may be installed within the cabinetry 36 with mounting flanges 38, 42 extending upwardly therefrom and mounting flange 34 extending downwardly therefrom. The keyhole openings of the mounting flanges 34, 38, 42 are provided for easy removal of the water purification system 31 including the valve manifold 30 from the cabinetry 36, such as for replacement of filters or batteries.

Referring again to FIG. 1, the sink 12 may include a basin arranged to be positioned within an opening of a countertop 40, and further may include a spout 6, a cold faucet handle 10 to control the dispensing of cold water from the faucet 6, a hot faucet handle 8 to control the dispensing of hot water from the faucet 6, a cold water valve 32, and a hot water valve 33, both valves 32, 33 being hidden from view under the countertop 40. The countertop 40 is shown mounted to the cabinetry 36 utilizing any suitable hardware. A cold-water line 14 extends upwardly from a cold-water cut-off valve 22 to the cold-water valve 32 to deliver cold water, and a hot water line 18 extends upwardly from a hot water cut-off valve 26 to the hot water valve 33 to deliver hot water. While the sink 12 of FIG. 1 includes separate cold water and hot faucet handles, 8, 10, other faucets can control hot and cold water flow through a single valve mechanism. While a kitchen sink 12 is portrayed in FIG. 1, the valve manifold 30 of the water purification system 31 may also be applied to other applications (for example, bathroom sink faucets), where it is desirable to filter a portion of the water supplied through the spout.

As best shown in FIGS. 1-4, the valve manifold 30 of the water purification system 31 is shown attached along the length of the cold-water line 14 of the sink 12. In particular, the valve manifold 30 is provided with externally threaded couplings 56, 96 at the inlet and outlet ports 52, 95 to connect the valve manifold 30 within the length of the cold-water line 14 utilizing suitable couplings 58, 94. As shown in FIG. 2, with the valve manifold 30 affixed within the cold-water line 14, water flows from the cold-water line 14 in the direction of arrow 14a and enters the valve manifold 30 for filtering and exits at 14b to be returned to the cold-water line 14.

Referring now to FIGS. 1-4, user input for requesting filtered water may be provided through a switch 106 connected to a control unit 50 of the system 31 through a wired conductor 102. The control unit 50 may be located within a system enclosure 86 having a cover 90, and may be provided in the form of a printed circuit board (PCB). The switch 106 may be a rocker switch or a spring-loaded switch such that the switch returns to its start position as soon as manual force is removed. As shown in FIG. 1, the switch 106 may be adhered to the bottom surface of the countertop 40 within the cabinetry 36 utilizing a backing 110 having an adhesive layer. Alternatively, the switch 106 may be adhered or affixed to the bottom surface of the countertop 40 in other ways that are known. The switch 106 may also be placed at other locations within the cabinetry 36 or on the countertop 40 based upon user preference and cosmetic considerations.

In FIG. 1, the hot water line 18 supplying the sink 12 with hot water is not connected to the valve manifold 30. In other embodiments, the valve manifold 30 may connected to the hot water line 18 instead of the cold-water line 14, or in addition to the cold-water line 14 (if a second valve manifold is provided). For example, hot filtered water may be dispensed for drinks or to use for cooking. As can be understood, while the valve manifold 30 is described as part of a water purification system 31 for providing filtered water from the cold-water line 14, it can also be utilized as part of a water purification system utilizing water from the hot water line 18 in a similar fashion.

Figure 3:
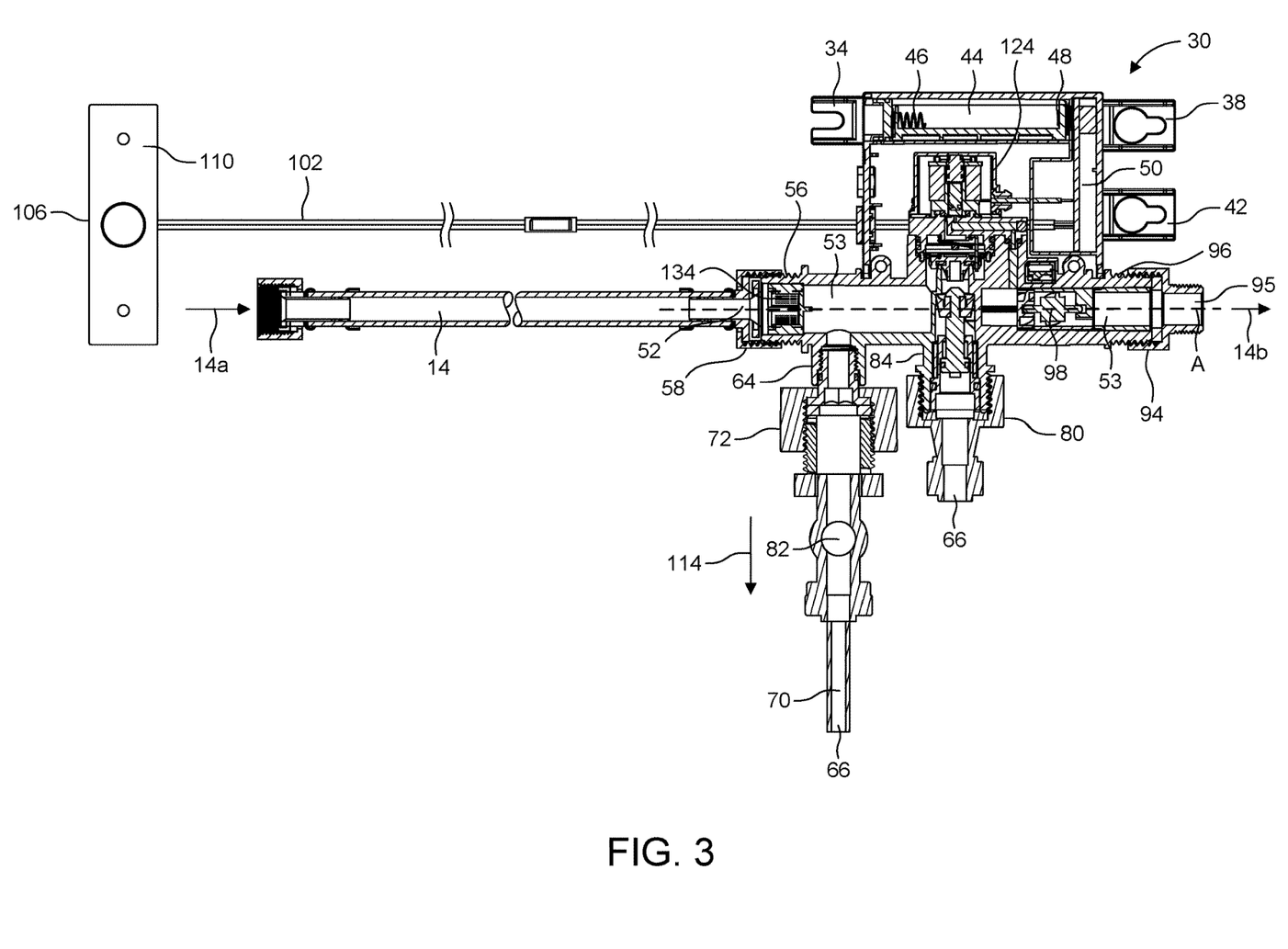
FIG. 3 is a cross-sectional view of the first exemplary embodiment valve manifold of the present invention.
Figure 4:
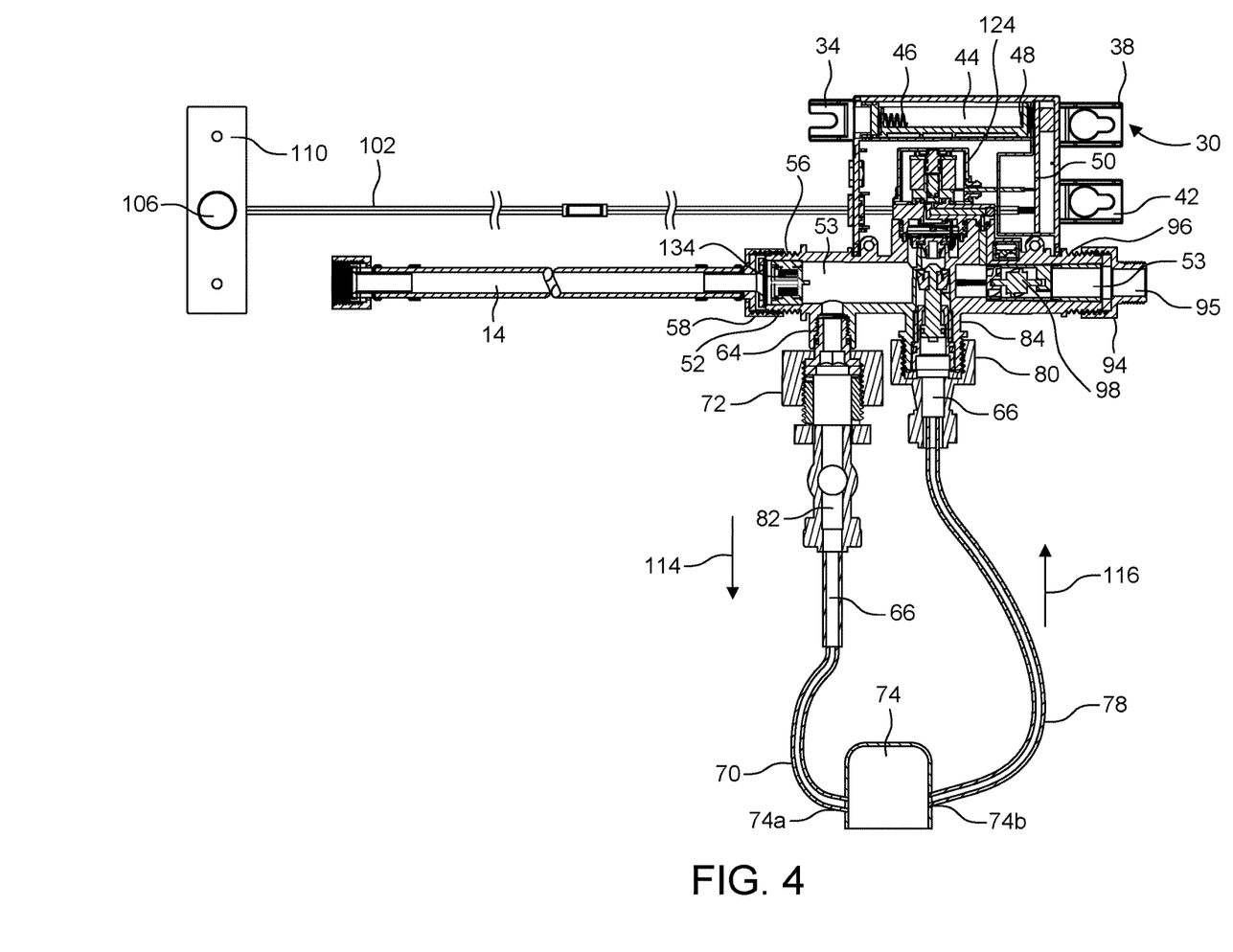
FIG. 4 is another cross-sectional view of the first exemplary embodiment valve manifold of the present invention connected to a filter assembly.

FIGS. 2-4 show an exemplary embodiment of the valve manifold 30. Under this embodiment, the valve manifold 30 includes a bypass passageway 53 that extends from a housing inlet port 52 to a housing outlet port 95. A coarse filter screen 134 may be positioned within the bypass passageway 53 in proximity to the housing inlet port 52 to prevent large particles from passing through the valve manifold 30. Along its length, the bypass passageway 53 includes a filter inlet port 64 to enable water to be diverted from the bypass passageway 53 to a filter assembly 74, and a filter outlet port 84 (also referred to as a return port) to enable filtered water flowing from the filter assembly 74 to be returned to the bypass passageway 53. The filter assembly 74 (shown schematically in the figures) may be any suitable water filtration system. For example, the filter assembly may comprise a reverse osmosis tank for storing filtered water until demand for filtered water is initiated. The filter assembly 74 may be a self-cleaning screen filter or other replaceable or removable sediment filter to reduce the amount of particulates or unwanted chemicals in the water being filtered.

Referring now to FIG. 4, a filter supply line 70 connects to the filter inlet port 64 by a suitable connector, e.g., a threaded fitting 72, and extends from the filter inlet port 64 to an inlet 74a of the filter assembly 74 to fluidly connect the filter inlet port 64 to the filter assembly 74. Likewise, a filter discharge line 78 (FIG. 4) extends from an outlet 74b of the filter assembly 74 and connects with the filter outlet port 84 of the bypass passageway 53 utilizing a suitable connector, e.g., a threaded fitting 80, to fluidly connect the filter assembly 74 with the filter outlet port 84. The filter supply line 70 and the filter discharge line 78 may be formed of a suitable flexible tubing. Together, the filter supply line 70, the filter assembly 74, and the filter discharge line 78 form a filter passageway 66 through which water flows in the direction indicated by arrows 114, 116 for filtration. A gate valve 82 may be provided upstream to control the flow of water to the filter assembly 74.

Referring now to FIGS. 3-6, a solenoid valve assembly 124 is disposed within the valve manifold 30. The solenoid valve assembly 124 includes a housing 126 for containing a plurality of coil windings 128 positioned around a centrally-located piston 62, the piston 62 being disposed within the filter outlet port 84 (FIG. 3). The solenoid valve assembly 124 may be powered by a DC power source, e.g., batteries (not shown) housed within a battery housing 44 (e.g., FIG. 3), or an AC source, e.g., 110V household power. The battery housing 44 may include a battery contact spring 46 and a battery contact 48 to obtain a consistent electrical connection between the battery (not shown) and the solenoid valve assembly 124, as well as other electrical components of the valve manifold 30, e.g., the control unit 50. The control unit 50 may include control circuitry for controlling operation of the solenoid valve assembly 124 in response to actuation of a wired switch 106. In some embodiments, circuitry that controls operation of the solenoid valve assembly 124 may be incorporated into the solenoid valve assembly 124. The control unit 50 may receive power from the DC or AC power source mentioned above.

Figure 6:
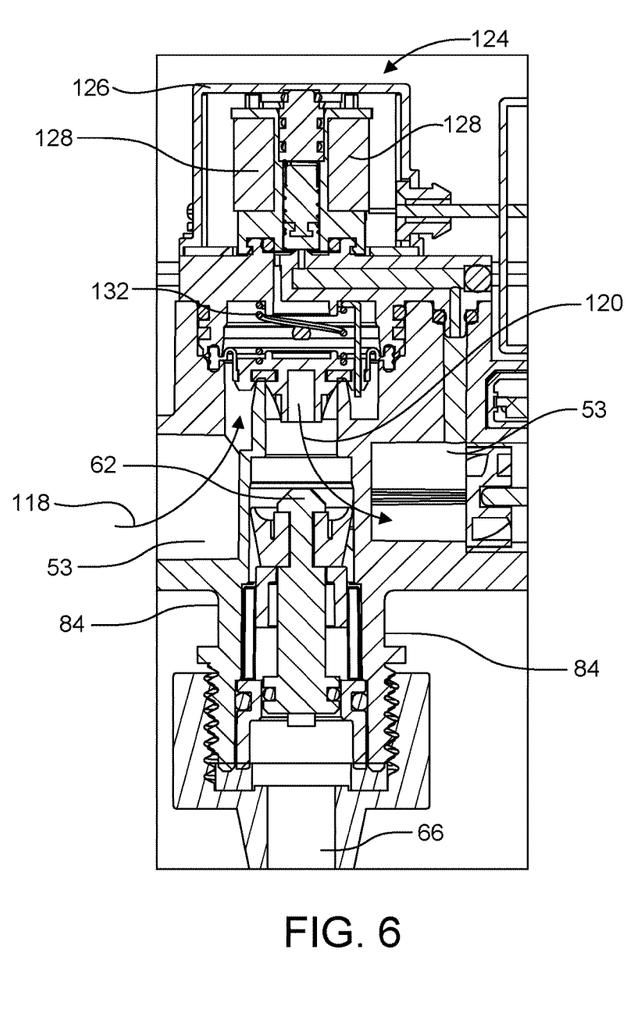
FIG. 6 is an enlarged cross-sectional view of a portion of the first exemplary embodiment valve manifold of the present invention illustrating the flow path of water therethrough during filtration bypass; and, FIG. 7 is a flow diagram illustrating an example of operation of the first exemplary embodiment valve manifold of the present invention.

Referring now to FIGS. 3, 4, and 6, when the solenoid valve assembly 124 is not energized, the piston 62 is normally held in a downward open position by action of a solenoid spring 132 within the bypass passageway 53. This allows unfiltered water to flow through the valve manifold 30 from the inlet port 52, through the bypass passageway 53, through the outlet port 95, thus bypassing the filter assembly 74. Referring now to FIG. 6, in the area of the solenoid valve assembly 124, this bypass flow path is indicated by arrows 118 and 120. Also, when the solenoid valve assembly 124 is not energized, unfiltered water is permitted to flow through the filter inlet port 64 and into the reverse osmosis tank of the filter assembly 74 so that filtered water is stored within the filter assembly 74 until needed.

As shown in FIGS. 3 and 4, the inlet port 52 and the outlet port 95 are coaxial, meaning that both ports pass through the same axis A, and parallel, meaning that the passageway defined by the walls of the inlet port 52 and outlet port 95 are parallel to one another. Providing coaxial, parallel inlet and outlet ports 52, 95, provides for laminar fluid flow, noise reduction, and lower heat transfer, resulting in extending the longevity of the valve manifold 30 and water purification system 31. In addition, this arrangement simplifies the structure of the valve manifold 30.

Locating the solenoid valve assembly 124 on the filter outlet port 84 and locating the filter inlet port 64 upstream from the solenoid valve assembly 124 enables water to flow into the filter inlet port 64 and the filter assembly 74 when the solenoid valve assembly 124 is in both bypass and filtration positions. This enables water to flow through filter inlet port 64 and into the filter assembly 74 when water is bypassing the filter assembly 74. This functionality is particularly desirable if the filter assembly is a reverse osmosis system because most reverse osmosis systems require water flow to backwash and to produce drinking water while the filter assembly is being bypassed.

Figure 5:
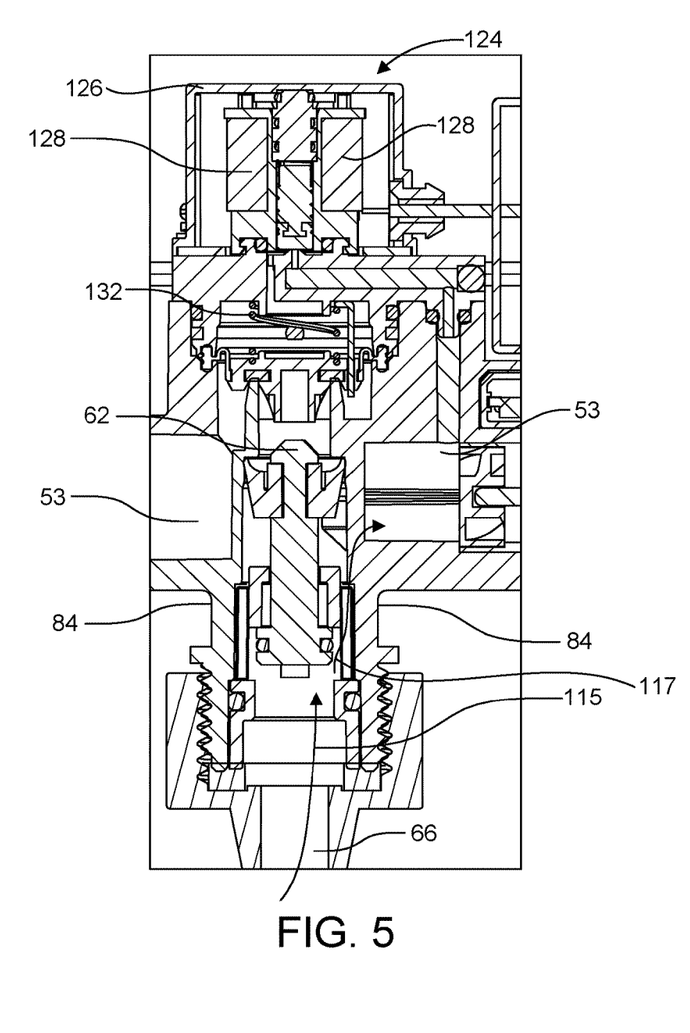
FIG. 5 is an enlarged cross-sectional view of a portion of the first exemplary embodiment valve manifold of the present invention illustrating the flow path of water therethrough during filtration.

Referring now to FIGS. 3-5, a user can request filtered water by actuating the switch 106. In response, the solenoid valve assembly 124 is energized and a magnetic field is created which pulls the piston 62 upwardly towards the coil windings 128 and against action of the solenoid spring 132. This closes the bypass passageway 53 and opens the filter outlet port 84 to enable water to flow through the filter assembly 74. Filtered water exits the filter assembly 74 through an outlet 74b and is returned to the bypass passageway 53 through the filter discharge line 78 and return portal 84. The path of the filtered water reentering the bypass passageway 53 through the return portal 84 is indicated at arrows 115 and 117 in FIG. 5.

Referring now to FIGS. 3-4, one or more flow sensors 98 may be installed within the bypass passageway 53 to detect the flow of water therethrough. The flow sensors 98 may be connected through circuitry to the control unit 50. The control unit 50 may include control circuitry for controlling operation of the valve manifold 30 in response to detection of water flow by the one or more flow sensors 98. When water flow is detected by the flow sensors 98, the control unit 50 can activate the valve manifold 30. When filtered water is desired, the user can actuate the switch 106 to send a signal to the control unit 50 to send power from the battery (not shown) to energize the solenoid valve assembly 124. Energizing the solenoid valve assembly 124 causes the piston 62 to be pulled upwardly to block the flow of water through the bypass passageway 53 and route the water from the filter assembly 74 where it is filtered prior to being dispensed through the spout 6.

The control unit 50 may include a timer. When water flow is no longer detected by the flow sensors 98, such as by closing the cold faucet handle 10, the timer may be started. If the user reopens the cold faucet handle 10 before a predefined interval of time has elapsed, then the control unit 50 continues to energize the solenoid valve assembly 124 to continue diverting water from the filter assembly 74. In the event the predefined time interval elapses before the user reopens the cold faucet handle 10, then the control unit 50 de-energizes the solenoid valve assembly 124 to permit unfiltered water to flow through the bypass passageway 53, or until such time as the switch 106 is re-actuated, thus extending the life of the filters in the filter assembly 74.

Figure 7:
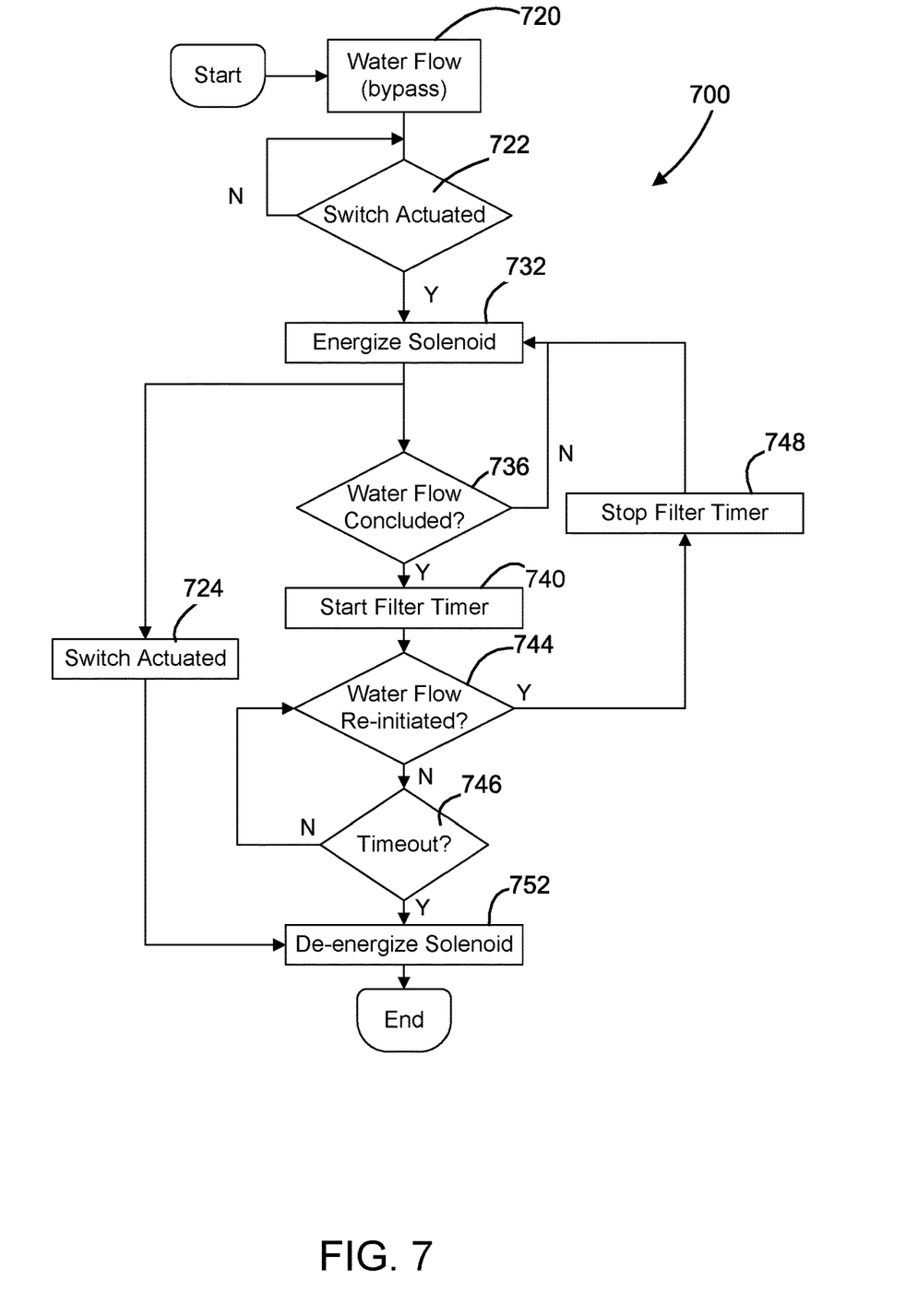

Referring now to FIG. 7, there is shown a flow chart 700 illustrating an example of operation of a water purification system 31 of FIGS. 1-6. Beginning with 720, water is flowing through the bypass passageway 53 and the solenoid valve assembly 124 is de-energized, meaning that water is able to flow into the filter inlet port 64 but not out of the filter outlet port 84. When the switch 106 is actuated (step 722), the solenoid valve assembly 124 is energized (step 732), which enables water to flow through the filter assembly 74 and the filter outlet port 84. This results in filtered water being discharged from the outlet port 95.

Once the solenoid valve assembly 124 has been energized, there are two ways in which it can be de-energized (step 752)-resulting in unfiltered water being discharged from the outlet port 95. First, solenoid valve assembly 124 will be de-energized if a user actuates the switch 106 again (step 724). Second, the solenoid valve assembly 124 will be de-energized if the system 31 detects that water flow has ceased for a predetermined period of time (for example, if the cold faucet handle 10 is moved to a closed position). If the water purification system 31 senses that flow has stopped (step 736) a timer is initiated (step 740). If water flow is sensed (step 744) before the timer reaches a predetermined time period (step 744), e.g., 1-10 seconds, then the timer is stopped (step 748) and the solenoid valve assembly 124 remains energized. If the timer reaches the predetermined time period without flow being detected (step 746), the solenoid valve assembly 124 will be de-energized (step 752).

As such, an invention has been disclosed in terms of preferred embodiments and alternate embodiments thereof. Of course, various changes, modifications, and alterations from the teachings of the present invention may be contemplated by those skilled in the art without departing from the intended spirit and scope thereof. It is intended that the present invention only be limited by the terms of the appended claims.

The invention claimed is:

1. A valve manifold for use as part of a purification system for water supplied to a faucet through a water supply conduit, the faucet configured to move between a closed position to stop flow of water, and an open position to enable flow of water, the valve manifold comprising:
   a housing having an inlet for receiving unfiltered water from the water supply conduit, an outlet for expelling the water to the water supply conduit in a flow direction, and a bypass passageway in fluid communication with the housing inlet and outlet;
   a filter circuit comprising a filter inlet in fluid flow communication with the bypass passageway, filtration media, and a filter outlet in fluid flow communication with the bypass passageway, the filter outlet being downstream from the filter inlet in the flow direction;
   an electrically operated valve positioned within the bypass passageway and biased in an open position that permits unfiltered water to flow through the bypass passageway from the housing inlet to the housing outlet in the flow direction and prevents a flow of water through at least one of the filter inlet and the filter outlet, the electrically operated valve also having a closed position that permits filtered water to flow through the filter inlet and the filter outlet and prevents unfiltered water from flowing through the housing outlet;
   a control unit configured to selectively energize and de-energize the electrically operated valve, wherein energizing the electrically operated valve causes the electrically operated valve to move to the closed position and de-energizing the electrically operated valve causes the electrically operated valve to move to the open position;
   a switch, which when actuated, provides a signal to the control unit to energize the electrically operated valve;
   a sensor to detect whether water is flowing through valve manifold, the sensor being electrically connected to the control unit;
   wherein upon movement of the faucet from the opened position to the closed position, a timer is started to measure against a predefined time period, wherein the control unit is configured to maintain the electrically operated valve in an energized state in the event the faucet is reopened during the predefined time period, and to de-energize the electrically operated valve in the event the predefined time period lapses before the faucet is reopened, the control unit remaining configured to re-energize the electronically operated valve upon actuation of the switch.

2. The valve manifold of claim 1, wherein the filter inlet is located on the bypass passageway at a position that is upstream from the filter outlet when water flows through the bypass passageway from the housing inlet to the housing outlet in the flow direction.

3. The valve manifold of claim 1, wherein the electrically operated valve is a solenoid valve.

4. The valve manifold of claim 1, wherein the switch is spring-loaded.

5. The valve manifold of claim 1, wherein the switch has a wired electrical connection to the control unit.

6. The valve manifold of claim 1, wherein the switch has at least one selected from the group of an adhesive backing and fastener holes, that enable the sensor to be mounted on or beneath a surface.

7. The valve manifold of claim 1, further comprising a plurality of mounting flanges to facilitate mounting of the valve manifold within cabinetry.

8. The valve manifold of claim 1, further comprising a battery housing for receiving a battery.

9. The valve manifold of claim 1, wherein the housing includes an inlet coupling for connecting to the water supply conduit at an upstream position and a downstream coupling for connecting to the water supply conduit at a downstream position.

10. The valve manifold of claim 1, wherein the electrically operated valve is contained within the housing.

11. The valve manifold of claim 1, additionally comprising a lapsed time clock for monitoring the predefined time period.

12. A valve manifold for use as part of a purification system for water supplied to a faucet through a water supply conduit, the valve manifold comprising:
   a housing having a housing inlet for receiving unfiltered water from the water supply conduit, a housing outlet for returning unfiltered or filtered water to the water supply conduit, and a bypass passageway having a length extending from the housing inlet to the housing outlet;

a filter circuit comprising a filter inlet and a filter outlet, the filter inlet located on the bypass passageway at a position that is upstream from the filter outlet when water flows through the bypass passageway from the housing inlet to the housing outlet in a flow direction; and, an electrically operated valve positioned within the bypass passageway and normally in an open position to permit a flow of the unfiltered water through the bypass passageway from the housing inlet to the housing outlet, the electrically operated valve configured to be energized to move to a closed position to enable filtered water to flow from a filtration assembly and through the housing outlet, the electronically operated valve including a piston extending into the filter outlet and normally retained in a downward position therein to block flow of water from the filter circuit when the electronically operated valve is not energized.

13. The valve manifold of claim 12, wherein the housing inlet is coaxial with the housing outlet.

14. The valve manifold of claim 13, wherein the housing inlet and housing outlet are parallel to one another.

15. The valve manifold of claim 12, wherein when the electronically operated valve is energized, the piston moves to an upward position within the filter outlet to allow flow from the filter circuit.

16. The valve manifold of claim 15, wherein the electrically operated valve includes a spring for retaining the piston in the downward position.

* * * * *